United States Patent
Schneider et al.

(10) Patent No.: US 12,537,240 B2
(45) Date of Patent: Jan. 27, 2026

(54) DUAL-MODE OPTIMIZATION FOR A DISTRIBUTED COOLING SYSTEM

(71) Applicant: Caterpillar Inc., Peoria, IL (US)

(72) Inventors: Karl P. Schneider, Decatur, IL (US); Cameron T. Lane, Oro Valley, AZ (US); Andrew Olson, Vail, AZ (US)

(73) Assignee: Caterpillar Inc., Peoria, IL (US)

( * ) Notice: Subject to any disclaimer, the term of this patent is extended or adjusted under 35 U.S.C. 154(b) by 145 days.

(21) Appl. No.: 18/384,292

(22) Filed: Oct. 26, 2023

(65) Prior Publication Data

US 2025/0140961 A1    May 1, 2025

(51) Int. Cl.
*H01M 10/633*    (2014.01)
*B60L 58/26*    (2019.01)
*H01M 10/613*    (2014.01)
*H01M 10/625*    (2014.01)
*H01M 10/635*    (2014.01)
*H01M 10/6568*    (2014.01)

(52) U.S. Cl.
CPC ....... *H01M 10/633* (2015.04); *H01M 10/613* (2015.04); *H01M 10/625* (2015.04); *H01M 10/635* (2015.04); *H01M 10/6568* (2015.04); *B60L 58/26* (2019.02); *H01M 2220/20* (2013.01)

(58) Field of Classification Search
CPC ............. H01M 10/613; H01M 10/625; H01M 10/633; H01M 10/635; B60L 58/26
See application file for complete search history.

(56) References Cited

U.S. PATENT DOCUMENTS

| | | | |
|---|---|---|---|
| 10,336,180 B2 * | 7/2019 | Hussain | F02B 33/40 |
| 11,318,813 B2 | 5/2022 | Allgaeuer et al. | |
| 2016/0226110 A1 * | 8/2016 | Jin | H01M 10/613 |
| 2019/0329670 A1 | 10/2019 | Kouvo et al. | |
| 2020/0259229 A1 * | 8/2020 | Wu | H01M 10/625 |
| 2023/0112971 A1 | 4/2023 | Main | |

FOREIGN PATENT DOCUMENTS

| | | | |
|---|---|---|---|
| CN | 100414767 C | * 8/2008 | .......... B60L 11/1868 |
| CN | 107394308 B | 11/2017 | |
| CN | 108128118 A | 6/2018 | |

(Continued)

OTHER PUBLICATIONS

Translation of CN114976305A (Year: 2022).*
(Continued)

*Primary Examiner* — Fadey S. Jabr (57) ABSTRACT

Typically, electric power sources, such as batteries and fuel cells, require cooling to temperatures near or below ambient temperature for safe and efficient operation. Traditional cooling systems are not be able or practical to cool the components to the required temperatures, due to the lack of temperature differential between the required cooling temperature and the ambient temperature, which drives the heat transfer. Disclosed embodiments optimize the efficiency of a cooling system based on ambient conditions. In particular, embodiments determine input parameters from one or more sensed parameters, such as ambient temperature and ambient pressure, and utilize these input parameters in a process that maximizes the operation of cooling units in the most efficient mode.

20 Claims, 6 Drawing Sheets

(56) References Cited

FOREIGN PATENT DOCUMENTS

| CN | 110739505 | A |   | 1/2020  |              |
|----|-----------|---|---|---------|--------------|
| CN | 111127245 | A | * | 5/2020  | G01D 21/02   |
| CN | 111376672 | A |   | 7/2020  |              |
| CN | 112977002 | A | * | 6/2021  | B60H 1/00278 |
| CN | 114801651 | A |   | 7/2022  |              |
| CN | 114976305 | A | * | 8/2022  | B60L 53/60   |
| CN | 115402154 | A |   | 11/2022 |              |
| CN | 217804236 | U |   | 11/2022 |              |
| CN | 113147311 | B |   | 5/2023  |              |
| CN | 116080479 | A |   | 5/2023  |              |
| CN | 109683092 | B | * | 1/2025  | B60L 3/0045  |
| EP | 3677458   | B1|   | 7/2020  |              |
| KR | 101342909 | B1|   | 12/2013 |              |
| WO | 2012016885| A1|   | 2/2012  |              |

OTHER PUBLICATIONS

Written Opinion and International Search Report for Int'l. Patent Appln. No. PCT/US2024/046307, mailed Dec. 13, 2024 (9 pgs).

\* cited by examiner

DUAL-MODE OPTIMIZATION FOR A DISTRIBUTED COOLING SYSTEM

TECHNICAL FIELD

The embodiments described herein are generally directed to a distributed cooling system, and, more particularly, to dual-mode optimization of a distributed cooling system for a power source (e.g., battery) in electric equipment.

BACKGROUND

Mobile equipment are increasingly being manufactured with electric power sources, such as battery packs and fuel cells, instead of internal combustion engines. These electric power sources generate less heat than the internal combustion engine for the same power, but still are required to be cooled. The cooling requirements are unique in that the operating temperature range is much lower than the engine, such that the cooling system is not trivial even at the lower heat loads. Thus, cooling systems are employed to cool the electric power sources.

For safe and efficient operation, a cooling system must cool the temperature of the electric power source to set point at a low temperature, potentially below ambient temperature in hot environments. A traditional forced-convection water radiator system is not practically able to cool the electric power source to the required temperature, because there is not a sufficient temperature differential between the ambient temperature and required cooling temperature to drive heat transfer. Thus, the cooling system must incorporate a refrigeration system to achieve the required cooling temperature. Unfortunately, a refrigeration system is less energy efficient and more expensive in terms of cost, weight, volume and complexity than the typical radiator system. For at least this reason, a cooling system can become energy inefficient in environments with high ambient temperatures. Accordingly, thermal management systems have been developed to control the operation of the cooling system. For example, Chinese Patent Pub. No. CN113147311B, published on May 2, 2023, and International Patent Pub. No. WO/2012/016885A1, published on Feb. 9, 2012, describe air conditioning systems that are controlled based on ambient temperature, and Chinese Patent Pub. No. CN110739505A, published on Jan. 31, 2020, describes a dual-mode thermal management based on the temperature of the battery. The present disclosure is directed toward overcoming one or more of the problems discovered by the inventor.

SUMMARY

In an embodiment, a dynamically-controlled cooling system comprises: a plurality of cooling units configured to cool an electric power source, wherein each of the plurality of cooling units has a first cooling mode and a second cooling mode; a machine controller that includes at least one processor configured to receive one or more parameter values from one or more sensors, determine a cooling capacity for each of the first cooling mode and the second cooling mode based on a first subset of the one or more parameter values, determine a cooling efficiency for each of the first cooling mode and the second cooling mode based on a second subset of the one or more parameter values, determine a cooling demand based on a third subset of the one or more parameter values, and determine a cooling configuration based on the cooling demand, the cooling capacity, and the cooling efficiency, wherein the cooling configuration indicates one or both of a number of the plurality of cooling units to operate in the first cooling mode or a number of the plurality of cooling units to operate in the second cooling mode.

In an embodiment, a method to dynamically control a plurality of cooling units configured to cool an electric power source, wherein each of the plurality of cooling units has a first cooling mode and a second cooling mode, the method comprising, by at least one processor of a machine controller: receiving one or more parameter values from one or more sensors; determining a cooling capacity for each of the first cooling mode and the second cooling mode based on a first subset of the one or more parameter values, determining a cooling efficiency for each of the first cooling mode and the second cooling mode based on a second subset of the one or more parameter values, determining a cooling demand based on a third subset of the one or more parameter values, and determining a cooling configuration based on the cooling demand, the cooling capacity, and the cooling efficiency, wherein the cooling configuration indicates one or both of a number of the plurality of cooling units to operate in the first cooling mode or a number of the plurality of cooling units to operate in the second cooling mode.

In an embodiment, a non-transitory computer-readable medium having instructions stored thereon, wherein the instructions, when executed by a processor in a mobile equipment comprising a plurality of cooling units configured to cool an electric power source, each of the plurality of cooling units having a first cooling mode and a second cooling mode, cause the processor to: receive one or more parameter values from one or more sensors, determine a cooling capacity for each of the first cooling mode and the second cooling mode based on a first subset of the one or more parameter values, determine a cooling efficiency for each of the first cooling mode and the second cooling mode based on a second subset of the one or more parameter values, determine a cooling demand based on a third subset of the one or more parameter values, and determine a cooling configuration based on the cooling demand, the cooling capacity, and the cooling efficiency, wherein the cooling configuration indicates one or both of a number of the plurality of cooling units to operate in the first cooling mode or a number of the plurality of cooling units to operate in the second cooling mode.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

Figure 1:
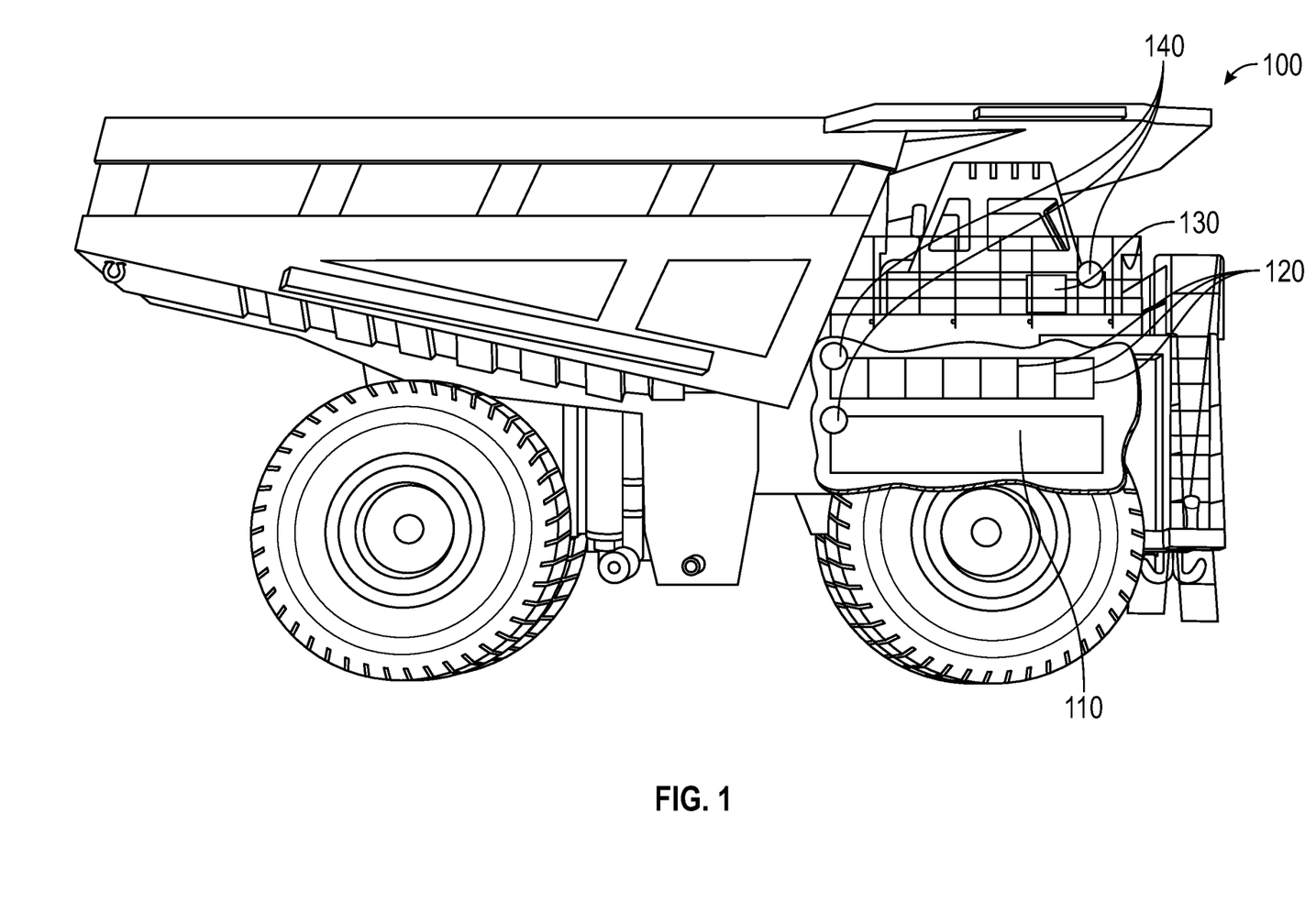
FIG. 1 illustrates a side view of an electric mobile equipment with a distributed cooling system, according to an embodiment.

FIG. 1 illustrates a side view of an electric mobile equipment 100 with a distributed cooling system, according to an embodiment. Mobile equipment 100 is illustrated as a mining truck. However, mobile equipment 100 may be any electric equipment that utilizes a distributed cooling system. Other examples of mobile equipment 100 include, without limitation, an excavator, dump truck, asphalt paver, backhoe loader, skid steer, track loader, cold planer, compactor, dozer, electric rope shovel, forest machine, hydraulic mining shovel, material handler, motor grader, pipe-layer, road reclaimer, telehandler, tractor-scraper, or the like. Mobile equipment 100 may be operated by a human (e.g., locally or remotely) and/or by an autonomous system.

In the illustrated example, mobile equipment 100 includes an electric power source 110, which is configured to power mobile equipment 100. Electric power source 110 may be a battery pack, a fuel cell, and/or the like. However, in a primary embodiment, electric power source 110 is a battery pack comprising one or more battery cells. For example, electric power source 110 may comprise a lithium-ion battery, which is known for its high energy density, lightweight design, and rechargeable nature, making it suitable for providing sustained power to mobile equipment 100. Another option is a lead-acid battery, recognized for its durability, cost-effectiveness, and ability to deliver high current outputs, making it ideal for tasks requiring rapid bursts of power, such as starting heavy mobile equipment 100. However, it should be understood that the present embodiments may be compatible with any type of battery or other electric power source 110.

Electric power source 110 is cooled by a distributed cooling system that comprises a plurality of cooling units 120. Cooling units 120 are responsible for regulating and maintaining the temperature of electric power source 110 within an acceptable range, thereby preventing overheating and ensuring efficient and safe operation. Each cooling unit 120 may be capable of operating in a plurality of cooling modes, including a first cooling mode, a second cooling mode, or a third mode (off).

The number of cooling units 120 will generally be dictated by the size of electric power source 110. For example, commercially available cooling units 120 are typically limited in size to 15 kilowatts (kW) or less. Heat load in an electric power source 110 that is a battery is typically 3-5% of total power. Thus, machines with over 300 kW in capacity will likely require more than one cooling unit 120. The largest mining trucks today have capacities of around 3000 kW, which would require at least ten cooling units 120 for propulsion, and likely more for high power charging.

Each of the plurality of cooling units 120 may be controlled by a machine controller 130. Machine controller 130 may receive data from one or more sensors 140. In particular, each sensor 140 may be configured to measure a parameter and transmit (e.g., periodically, continuously, when polled, etc.) the values of that parameter to machine controller 130. Machine controller 130 may receive these parameter values from sensor(s) 140, analyze these parameter values according to one or more of the disclosed processes, and control one or more cooling units 120 based on this analysis. This analysis and control may be performed in real time to dynamically adjust the operation (e.g., operating modes) of cooling units 120 in real time. The parameters monitored by machine controller 130 in this manner may include, without limitation, ambient temperature, temperature of electric power source 110, coolant temperature, ambient pressure, electrical power estimate, heat load estimate, demand information and/or the like.

Figure 2:
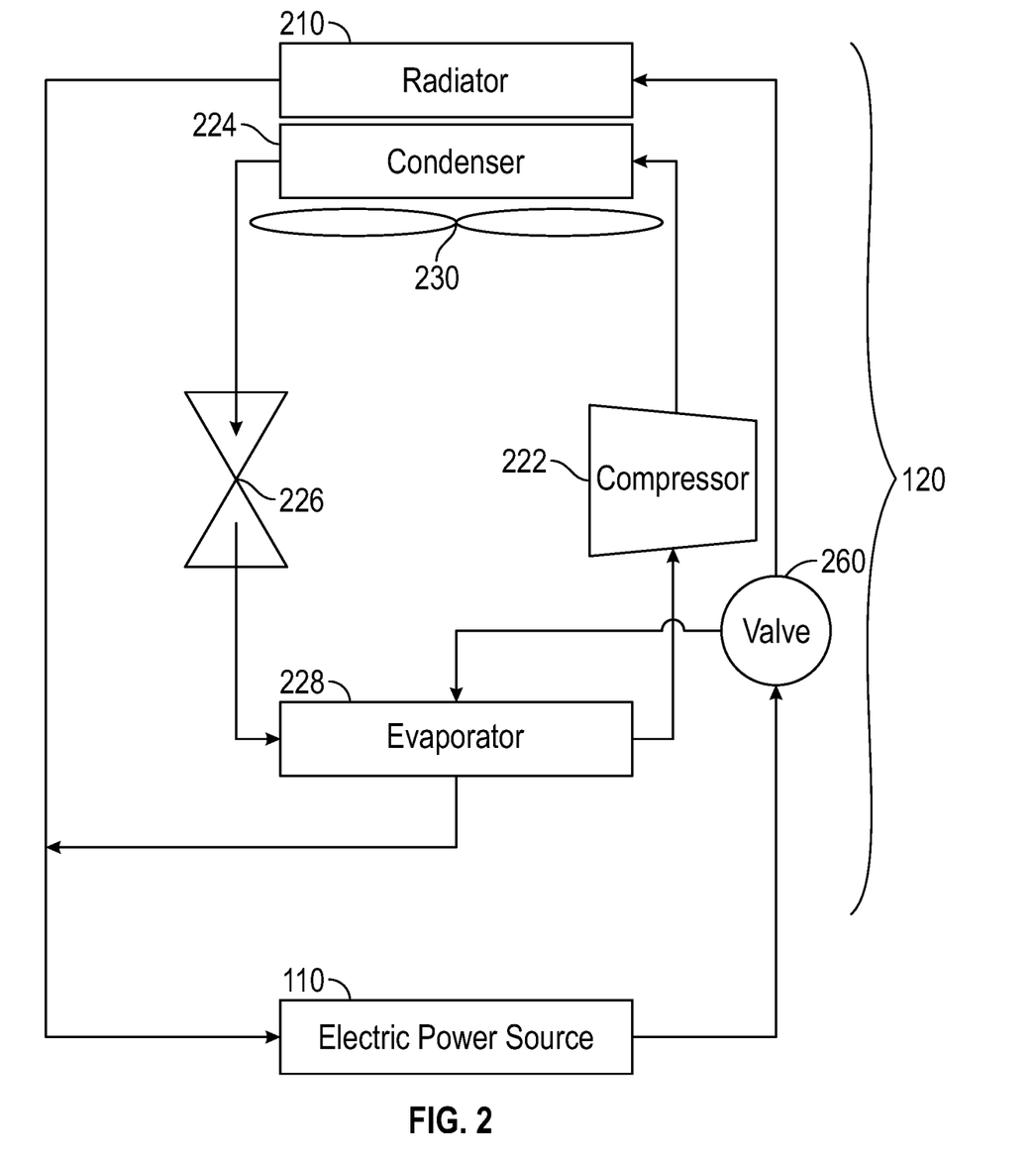
FIG. 2 illustrates a cooling unit, according to an embodiment.

FIG. 2 illustrates a cooling unit 120, according to an embodiment. Cooling unit 120 comprises a radiator circuit, including a radiator 210, and a refrigeration circuit, including a compressor 222, a condenser 224, an expansion valve 226, and an evaporator 228. In the radiator circuit, coolant, flowing through radiator 210, is cooled by a fan 230. In the refrigeration circuit, compressor 222 circulates the refrigerant in gaseous form under pressure. Condenser 224 receives the high-pressure gaseous coolant from compressor 222, and transfers heat from the refrigerant resulting in a loss in enthalpy and transition in state to liquid or near liquid by forced convection with the help of airflow provided by the fan 230. Expansion valve 226 receives the refrigerant from condenser 224, and reduces pressure and correspondingly entropy, resulting in a temperature decrease to be used in the evaporator 228 for cooling. Evaporator 228 receives the cold vapor mixture from the expansion valve 226, and then achieves heat transfer from the battery coolant at the higher temperature, resulting in an increase in enthalpy and evaporation to vapor state for entry into the compressor 222. The gaseous refrigerant, output by evaporator 228, is then supplied to compressor 222 for another cooling cycle. Cooling unit 120 is capable of operating in at least a first cooling mode and a second cooling mode. The first cooling mode and the second cooling mode may be operated in combination and simultaneously with other parameters. Beyond the third mode (off state), the first and second cooling modes are not "all or nothing" states, they can be modulated for partial performance, and this becomes be part of the control.

In the first cooling mode, the refrigeration circuit is used. In this case, valve 260 is operated to direct the flow of coolant through the refrigeration circuit via evaporator 228, such that chilled coolant from evaporator 228 flows through electric power source 110, to thereby cool electric power source 110. In particular, the flow of coolant through electric power source 110 removes heat from electric power source 110.

In the second cooling mode, the refrigeration circuit is not used. In this case, valve 260 is operated to direct the flow of coolant through the radiator circuit via radiator 210. Since the coolant is not chilled within the refrigeration circuit, the coolant from radiator 210 may not be as effective in reducing the temperature in electric power source 110, but is generally more energy efficient.

In a third mode, cooling unit 120 can be turned off. There is a penalty to run cooling unit 120 in the first or second cooling modes. Thus, if cooling is not required, the third mode may be used. In the third mode, fan 230 and compressor 222 may be turned off. Ideally, coolant valve 226 will also be closed in the third mode, to push coolant to any active cooling units 120 (e.g., operating in the first or second cooling modes).

It should be understood that, in some cases, a first subset of cooling units 120 may operate in the first cooling mode while a second subset of cooling units 120 simultaneously operates in the second cooling mode. In other cases, all of cooling units 120 may operate in the same mode, all of cooling units 120 may be off, or some cooling units 120 may be on (e.g., in the first cooling mode and/or the second cooling mode), while other cooling units 120 are off. The particular permutation of first/second cooling mode and on/off for each individual cooling unit 120 may be specified by a cooling configuration that is determined according to the disclosed processes. While the cooling configuration will primarily be described herein as specifying the particular mode in which each cooling unit 120 will operate, it should be understood that a cooling configuration may specify different or additional parameters. Examples of other parameters that may be specified in the cooling configuration, along with the cooling mode, include, without limitation, the flow rate of coolant (e.g., pump speed), the speed of fan 230, the speed of compressor 222, and/or any other controllable variable of a cooling unit 120.

Figure 3:
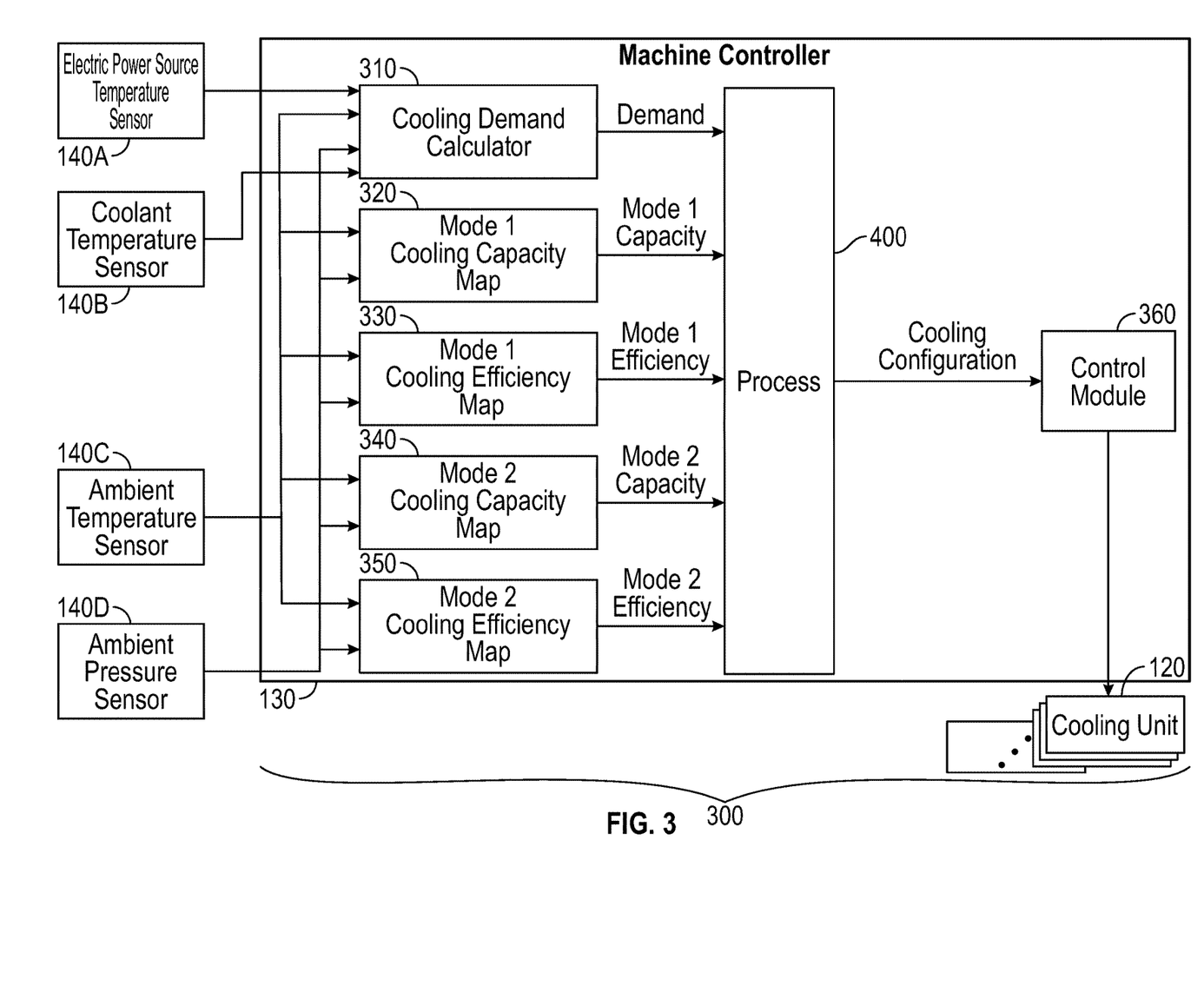
FIG. 3 illustrates a data flow in a machine controller that implements dual-mode optimization for a distributed cooling system, according to an embodiment.

FIG. 3 illustrates a data flow in machine controller 130, according to an embodiment. Machine controller 130 monitors parameters output by one or more sensors 140, such as a battery temperature sensor 140A, a coolant temperature sensor 140B, an ambient temperature sensor 140C, and/or an ambient pressure sensor 140D. Machine controller 130 may process these parameters. In particular, machine controller 130 may comprise one or more calculators, such as a cooling demand calculator 310, and/or one or more maps, such as a capacity map 320 for the first cooling mode, an efficiency map 330 for the first cooling mode, a capacity map 340 for the second cooling mode, and an efficiency map 350 for the second cooling mode. The calculator(s) and/or map(s) may be used to derive inputs to a process 400 from the values of the monitored parameters. Process 400 processes these inputs to produce a cooling configuration, which may be provided to a control module 360. Control module 360 controls cooling units 120 based on the cooling configuration. This control may comprise setting the cooling mode (e.g., between the first cooling mode and the second cooling mode) of a cooling unit 120, activating or deactivating a cooling unit 120, setting one or more setpoints of a cooling unit 120, and/or the like, as defined in the cooling configuration. Calculator 310, maps 320-350, process 400, and control module 360 may be embodied in software (e.g., stored in memory) and/or hardware.

Electric power source temperature sensor 140A may be configured to detect the temperature of electrical power source 110 through a temperature sensing element and output the detected temperature as an electrical signal. Electric power source temperature sensor 140A may be designed to vary the electrical properties (e.g., resistance, voltage, or current) of the electrical signal in response to variations in the sensed temperature. Examples of electric power source temperature sensor 140A may include, without limitation, those manufactured by Texas Instruments™, Analog Devices™, Maxim Integrated™, Honeywell™, TE Connectivity™, STMicroelectronics™, or the like.

Coolant temperature sensor 140B may be configured to detect the temperature of the coolant in cooling units 120 through a temperature sensing element and output the detected coolant temperature as an electrical signal. Coolant temperature sensor 140B may be designed to vary the electrical properties (e.g., resistance, voltage, or current) of the electrical signal in response to variations in the sensed coolant temperature. Examples of coolant temperature sensor 140B may include, without limitation, those manufactured by Delphi™, Bosch™, Denso™, and the like.

Ambient temperature sensor 140C may be configured to detect ambient temperature through a temperature sensing element and output the detected ambient temperature as an electrical signal. Ambient temperature sensor 140C may be designed to vary the electrical properties (e.g., resistance, voltage, or current) of the electrical signal in response to variations in the sensed ambient temperature. Examples of ambient temperature sensor 140C may include, without limitation, those manufactured by Delphi™, Bosch™, Denso™, or the like.

Ambient pressure sensor 140D may be configured to detect the ambient pressure through a pressure-sensitive element and output the detected ambient pressure as an electrical signal. Ambient pressure Sensor 140D, which may also be known as a barometric pressure sensor, functions by utilizing a pressure-sensitive element that reacts to atmospheric pressure changes. Ambient pressure sensor 140D may be designed to vary the electrical properties (e.g., resistance, voltage, or current) of the electrical signal in response to variations in the sensed ambient pressure. Examples of ambient pressure sensor 140D may include, without limitation, those manufactured by Bosch Sensortec™, Honeywell™, TE Connectivity™, or the like.

Machine controller 130 is configured to receive the electrical signals from sensor(s) 140, and derive the values of the corresponding parameters from the electrical signals. As discussed above, these parameters may include the temperature of electric power source 110, the temperature of the coolant, the ambient temperature or temperature gradient coolant to ambient, and the ambient pressure. Additionally or alternatively, these parameters may include heat load, representing a cooling requirement, which may be provided to machine controller 130 by electric power source 110 as part of the proactive determination of the most efficient cooling configuration. If sensor(s) 140 are analog, the electrical signals may undergo analog-to-digital conversion for compatibility with machine controller 130. Machine controller 130 utilizes software and/or hardware to process the data to determine control actions, such as selecting a cooling mode for each cooling unit 120, with the aim of optimizing the operation of cooling units 120. Additionally, machine controller 130 may include a closed-loop control for real-time adjustments. In other words, machine controller 130 processes sensor data into actionable commands that ensure optimal performance of a distributed system of cooling units 120. The closed loop control on cooling demand D may be adjusted based on actual performance (temperature compared to target).

Machine controller 130 may comprise a cooling demand calculator 310. Cooling demand calculator 310 may receive one or more parameter values from sensor(s) 140, such as the temperature of electric power source 110, the temperature of the coolant, the ambient temperature, and/or the ambient pressure. Cooling demand calculator 310 may comprise an algorithm that estimates the cooling demand (D) necessary to maintain the temperature of electric power source 110 within an acceptable range. Cooling demand calculator 310 may determine the cooling demand in any suitable unit of measure (e.g., British thermal units (BTUs)/h, horsepower, kilowatts, etc.).

Machine controller 130 may comprise a capacity map 320 for the first cooling mode. Capacity map 320 may output a capacity (C1) of the first cooling mode, based on one or more parameters, such as ambient temperature or temperature gradient coolant to ambient and ambient pressure. Capacity map 320 may be implemented as an algorithm, a lookup table, or via any other suitable logic and may contain machine learning to provide adjustment for actual installed performance based on previous data due to system degradation, variability, etc.

Machine control 130 may comprise an efficiency map 330 for the first cooling mode. Efficiency map 330 may output an efficiency (E1) of the first cooling mode, based on one or more parameters, such as ambient temperature or temperature gradient coolant to ambient and ambient pressure. Efficiency map 330 may be implemented as an algorithm, a lookup table, or via any other suitable logic. Preferably, efficiency map 330 is implemented in the same manner as capacity map 320.

Machine controller 130 may comprise a capacity map 340 for the second cooling mode. Capacity map 340 may output a capacity (C2) of the second cooling mode, based on one or more parameters, such as ambient temperature or temperature gradient coolant to ambient and ambient pressure. Capacity map 340 may be implemented as an algorithm, a lookup table, or via any other suitable logic. Preferably, capacity map 340 is implemented in the same manner as capacity map 320.

Machine control 130 may comprise an efficiency map 350 for the second cooling mode. Efficiency map 350 may output an efficiency (E2) of the second cooling mode, based on one or more parameters, such as ambient temperature and ambient pressure. Efficiency map 350 may be implemented as an algorithm, a lookup table, or via any other suitable logic. Preferably, efficiency map 350 is implemented in the same manner as efficiency map 330.

Figure 4:
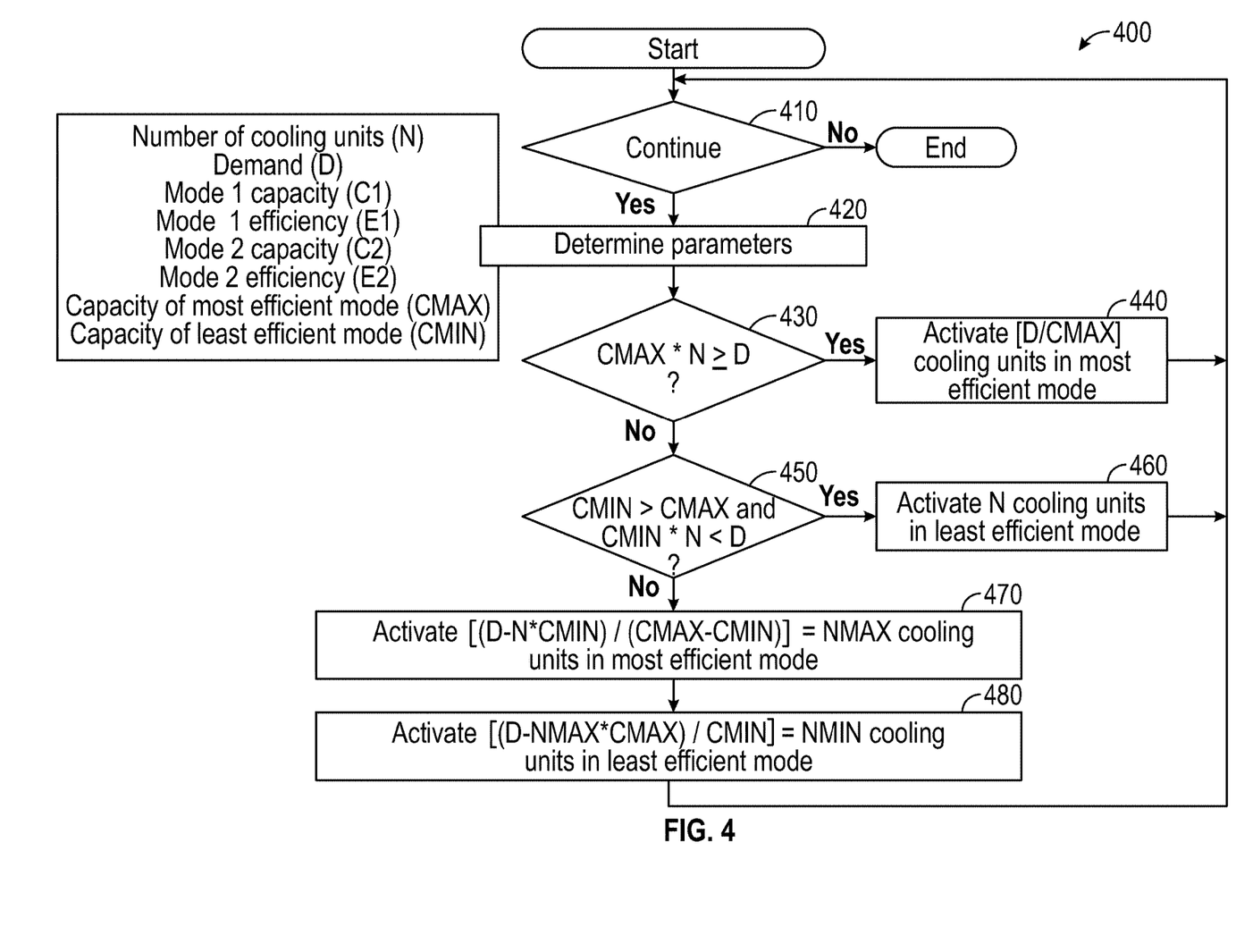
FIG. 4 illustrates a process for dual-mode optimization for a distributed cooling system, according to an embodiment.

Process 400 determines a cooling configuration based on the cooling demand D, the cooling capacities C1 and C2, and the cooling efficiencies E1 and E2, as will be described in more detail below. The cooling configuration may indicate one or both of a percentage or number of the plurality of cooling units 140 to operate in the first cooling mode or a percentage or number of the plurality of cooling units 140 to operate in the second cooling mode. The cooling configuration may also indicate a percentage or number of the plurality of cooling units 140 to be in a non-operational state (e.g., deactivated, turned off, etc.).

The cooling configuration, generated by process 400, may be communicated to a control module 360. Control module 360 may derive control signals from the cooling configuration, and transmit these control signals to cooling units 120. These control signals may switch the cooling mode in which individual cooling units 120 are operate (e.g., between the first and second cooling modes), activate or deactivate individual cooling units 120, adjust one or more setpoints of individual cooling units 120, and/or the like.

FIG. 4 illustrates a process 400 for dual-mode optimization for a distributed cooling system, according to an embodiment. Process 400 may be implemented in software and/or hardware within machine controller 130. While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 410, it is determined whether or not to continue process 400. Process 400 may continue as long as mobile equipment 100 is operating. Alternatively, process 400 may be toggled on or off by an operator of mobile equipment 100, an autonomous system, and/or the like. In this case, process 400 may continue as long as process 400 remains on. As long as process 400 continues, iterations of the subprocesses under subprocess 410 may be executed continuously, in real time, or periodically (e.g., according to a time interval). When determining to continue process 400 (i.e., "Yes" in subprocess 410), process 400 proceeds to subprocess 420. Otherwise, when determining not to continue process 400 (i.e., "No" in subprocess 410), process 400 ends.

In subprocess 420, the value of each input parameter that is required by process 400 is determined. These parameters may comprise the number of available cooling units 120 (e.g., a predefined value retrieved from memory), the demand (e.g., determined by cooling demand calculator 310), the capacities C1 and C2 of the first and second cooling modes, respectively (e.g., determined by capacity maps 320 and 340, respectively), and the efficiencies E1 and E2 of the first and second cooling modes, respectively (e.g., determined by efficiency maps 330 and 350, respectively). In addition, the parameters may comprise the capacity of the most efficient mode (CMAX) and the capacity of the least efficient mode (CMIN). The capacity CMAX of the most efficient mode may be determined as the one of capacities C1 and C2 that is associated with the cooling mode having the maximum efficiency. For example, when E1 is greater than E2, the capacity CMAX is determined to be C1. Conversely, when E2 is greater than E1, the capacity CMAX is determined to be C2. Similarly, the capacity CMIN of the least efficient mode may be determined as the one of capacities C1 and C2 that is associated with the cooling mode having the minimum efficiency. For example, when E1 is less than E2, the capacity CMIN is determined to be C1. Conversely, when E2 is less than E1, the capacity CMIN is determined to be C2.

In subprocess 430, it is determined whether or not the capacity CMAX of the most efficient mode, multiplied by the number N of cooling units 120, is greater than or equal to the demand D. In other words, it is determined whether or not operating all of the plurality of cooling units 120 in the most efficient cooling mode, from among the first and second cooling modes, is sufficient to satisfy the demand D of electric power source 110. When there is sufficient capacity (CMAX*N) in the most efficient cooling mode to meet the demand D (i.e., "Yes" in subprocess 430), process 400 proceeds to subprocess 440. Otherwise, when there is not sufficient capacity (CMAX*N) in the most efficient cooling mode to meet the demand D (i.e., "No" in subprocess 430), process 400 proceeds to subprocess 450.

In subprocess 440, the number of cooling units 120, required to satisfy the demand D, are activated in the most efficient mode. This number is equal to the value of the demand D, divided by the capacity CMAX of the most efficient mode, rounded up to the nearest integer. For example, if the number N of cooling units 120 is ten, the demand D is 27 kW, the capacity CMAX is 5 kW, and the most efficient mode is the second cooling mode, in subprocess 440, six cooling units 120 would be activated in the second cooling mode. The remaining four cooling units 120 may be deactivated or operated in a low-energy mode. Activation of cooling units 120 in subprocess 440 may be implemented by outputting a cooling configuration to control module 360 that specifies operation of the determined number of cooling units 120 in the most efficient mode. Since the unit state requested may round up, there often will be more total capacity available from requested cooling units 120 than desired, 30 versus 27 in this example. In this case the control module 360 will determine the optimal part load distribution of cooling units 120 (e.g. 4 cooling units 120 at 5 Kw and 1 cooling unit 120 at 2 kW, 5 units at 4.4 kW, etc.)

In subprocess 450, it is determined whether or not the demand D can be satisfied at all. In particular, when the capacity CMIN of the least efficient mode is greater than the capacity CMAX of the most efficient mode, but the capacity CMIN of the least efficient mode, multiplied by the number N of cooling units 120, is still less than the demand D, the demand D cannot be satisfied by the distributed cooling system. In this case, the cooling capacity will be prioritized over efficiency to meet demand D. For example, if the number N of cooling units 120 is ten, the demand D is 155 kW, the capacity CMIN is 15 kW, then the demand D cannot be satisfied, even when all N cooling units 120 are operated in the highest capacity cooling mode (e.g., in the least efficient mode). When the demand D cannot be satisfied by the distributed cooling system (i.e., "Yes" in subprocess 450), process 400 proceeds to subprocess 460. Otherwise, when the demand D can be satisfied by the distributed cooling system (i.e., "No" in subprocess 450), process 400 proceeds to subprocesses 470 and 480.

In subprocess 460, all N of the cooling units 120 are activated in the least efficient mode. It should be understood that the demand D is an estimated value derived from cooling demand calculator 310. Thus, the fact that the demand D cannot be satisfied does not necessarily mean that electric power source 110 cannot be cooled to within an acceptable range of temperatures. Further, as there are thermal inertia and other margins in place to minimize sensitivity, other actions may be taken with power source controllers to limit demand D (power) to operate in a more preferred temperature zone. Activation of cooling units 120 in subprocess 460 may be implemented by outputting a cooling configuration to control module 360 that specifies operation of all N cooling units 120 in the least efficient mode.

In subprocesses 470 and 480, the optimal allocation of cooling units 120 between the most efficient mode and the least efficient mode is determined. This optimal allocation may be converted into a cooling configuration. In particular, the activation of a first number of cooling units 120 in the first cooling mode and a second number of cooling units 120 in the second cooling mode may be implemented by outputting a cooling configuration to control module 360 that specifies operation of the first number of cooling units 120 in the first cooling mode and the second number of cooling units 120 in the second cooling mode.

In subprocess 470, the number NMAX of cooling units 120 to be operated in the most efficient mode is determined. This number NMAX may be determined as the difference, between the demand D and the total capacity (N*CMIN) provided by all N cooling units 120 operating in the least efficient mode, divided by the difference, between the capacity CMAX of the most efficient mode and the capacity CMIN of the least efficient mode, rounded down to the nearest integer. For example, if the number N of cooling units 120 is ten, the demand D is 83, the capacity CMAX is 5 kW, the capacity CMIN is 15 kW, the most efficient mode is the second cooling mode, and the least efficient mode is the first cooling mode, then the number NMAX would equal six.

In subprocess 480, the number NMIN of cooling units 120 to be operated in the least efficient mode is determined. This number NMIN may be determined as the difference, between the demand D and the total capacity (NMAX*CMAX) provided by the NMAX cooling units 120 operating in the most efficient mode, divided by the capacity CMIN of the least efficient mode, rounded up to the nearest integer. Continuing the example used above for subprocess 480, the number NMIN would equal 4. Thus, six cooling units 120 would be operated in the second cooling mode, and the remaining four cooling units 120 would be operated in the first cooling mode, which provides a total capacity of 90 kW, which is sufficient to satisfy the demand D of 83 kW. Notably, the number of cooling units 120 that are operated in the most efficient mode is the maximum possible, while still allowing the remaining demand D to be satisfied with the remaining cooling units 120 operating in the least efficient mode.

Figure 5A:
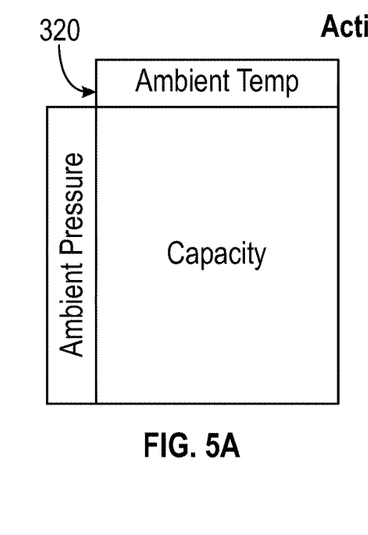
FIGS. 5A-5D illustrate maps used for dual-mode optimization, according to an embodiment.
Figure 5B:
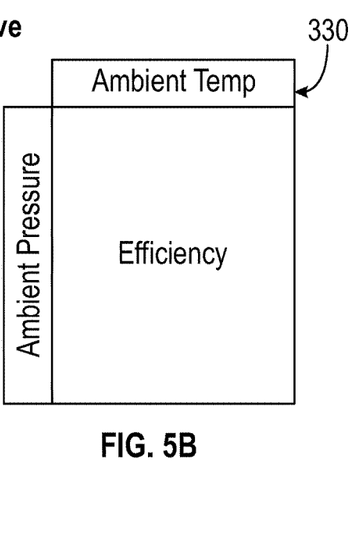
Figure 5C:
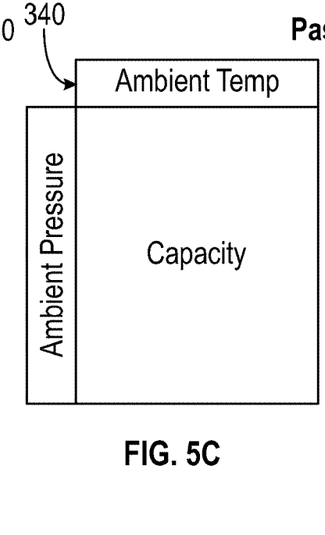
Figure 5D:
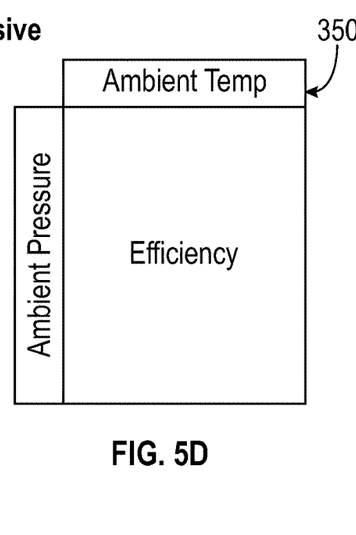

FIGS. 5A-5D illustrate maps used for dual-mode optimization, according to an embodiment. In particular, FIG. 5A illustrates capacity map 320 for the first cooling mode, FIG. 5B illustrates efficiency map 330 for the first cooling mode, FIG. 5C illustrates capacity map 340 for the second cooling mode, and FIG. 5D illustrates efficiency map 350 for the second cooling mode. In this example, the first cooling mode, which utilizes a refrigeration circuit, is an active cooling mode, whereas the second cooling mode, which does not utilize the refrigeration circuit, is a passive cooling mode. The capacity, which may also be referred to as "heat rejection," in each of capacity maps 320 and 340 may be determined as a function of ambient pressure and ambient temperature. Similarly, the efficiency, which may be the inverse of "parasitic power," in each of efficiency maps 330 and 350 may be determined as a function of ambient pressure and ambient temperature. The "parasitic power" includes all incremental elements in the cooling system, such as compressor 222, condenser 224, fan 230, and coolant pump.

Ambient temperature, coolant temperature, and ambient pressure are external conditions that impact the performance of the distributed cooling system. Ambient temperature influences the temperature differential between cooling units 120 and their surroundings, which affects the rate of heat transfer. The sensitivity to ambient pressure is the air density, which sets the mass flow used for condenser 224 heat rejection, such that higher altitude will have less condenser 224 capacity for the same temperature, but temperature also changes with altitude. Heat rejection is the process by which cooling units 120 dissipate the heat, absorbed from electric power source 110, into the external environment. All things equal, the first cooling mode, which utilizes the refrigeration circuit, will have capacity advantage or heat rejection while cooling set point is below ambient and a range of temperature above. This quickly transitions as the radiator 210 system quickly gains capacity proportional to ambient temperature gradient to set point, whereas the refrigerant circuit does not see the same sensitivity and eventually is unable to operate at lower temperatures due to system limitations. Parasitic power refers to the energy consumed by a cooling unit 120 in order to function. All things equal, the first cooling mode, which utilizes the refrigeration circuit, will consume higher parasitic power and have less efficiency than the second cooling mode, which does not utilize the refrigeration circuit.

Figure 6:
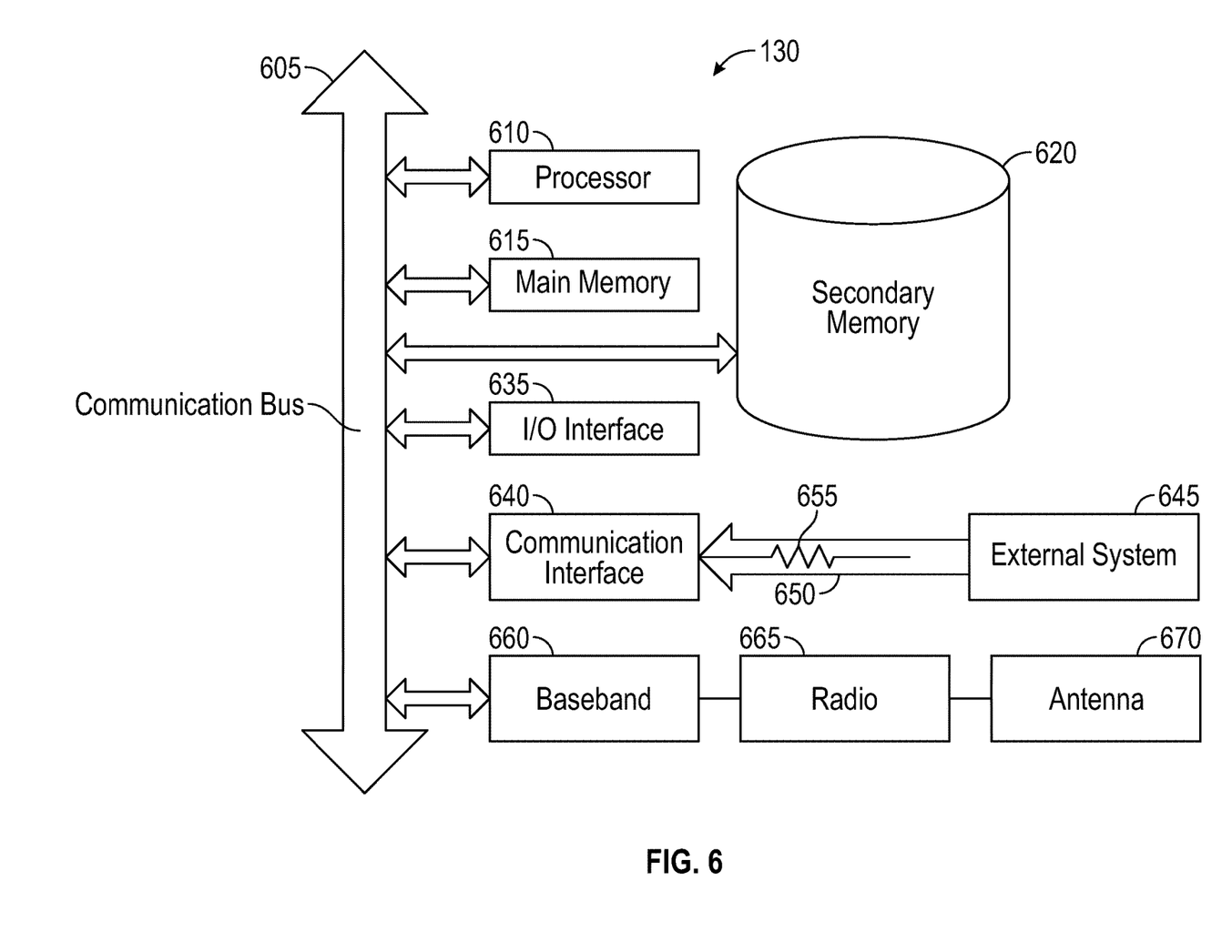
FIG. 6 illustrates an example architecture of a machine controller, according to an embodiment.

FIG. 6 illustrates an example of a controller, according to an embodiment. Controller 130 may comprise one or more processors 610. Processor(s) 610 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 610. Examples of processors which may be used with controller 130 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 610 may be connected to a communication bus 605. Communication bus 605 may include a data channel for facilitating information transfer between storage and other peripheral components of machine controller 130. Furthermore, communication bus 605 may provide a set of signals used for communication with processor 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Machine controller 130 may comprise main memory 615. Main memory 615 provides storage of instructions and data for programs executing on processor 610, such as one or more of the processes or functions discussed herein. It should be understood that programs stored in the memory and executed by processor 610 may be written and/or compiled according to any suitable language, including without limitation C/C++, Java, JavaScript, Perl, Python, Visual Basic, .NET, and the like. Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Machine controller 130 may comprise secondary memory 620. Secondary memory 620 is a non-transitory computer-readable medium having computer-executable code and/or other data (e.g., software implementing any process or function described herein) stored thereon. In this description, the term "computer-readable medium" is used to refer to any non-transitory computer-readable storage media used to provide computer-executable code and/or other data to or within controller 130. The computer software stored on secondary memory 620 is read into main memory 615 for execution by processor 610. Secondary memory 620 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Machine controller 130 may comprise an input/output (I/O) interface 635. I/O interface 635 provides an interface between one or more components of controller 130 and one or more input and/or output devices. For example, I/O interface 635 may receive the output of one or more sensors, and/or output control signals to one or more of the components of mobile equipment 100.

Machine controller 130 may comprise a communication interface 640. Communication interface 640 allows signals, such as data and software, to be transferred between machine controller 130 and external devices, networks, or other information sources and/or destinations (e.g., receiver(s)). For example, computer-executable code and/or data may be transferred to machine controller 130, over one or more networks, from a network server via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 130 with a network or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 640 is generally in the form of electrical communication signals 655. These signals 655 may be provided to communication interface 640 via a communication channel 650 between communication interface 640 and an external system 645. In an embodiment, communication channel 650 may be a wired or wireless network, or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 615 and/or secondary memory 120. Computer-executable code can also be received from an external system 645 via communication interface 640 and stored in main memory 615 and/or secondary memory 620. Such computer-executable code, when executed by processor(s) 610, enable machine controller 130 to perform the various processes or functions disclosed herein.

INDUSTRIAL APPLICABILITY

In some industrial contexts, such as construction, mining, farming, forestry, and the like, mobile equipment 100 may operate under high heat environments. Mobile equipment 100, such as trucks, bulldozers, and excavators, may rely on electric power sources 110, such as battery packs, to perform heavy-duty tasks. These electric power sources 110 generate a significant amount of heat during operation, which can potentially lead to overheating in high heat environments. Thus, cooling units 120 are used to dissipate this heat and ensure that electric power sources 110 operate within acceptable temperature ranges.

Accordingly, a dynamically-controlled cooling system is disclosed. The dynamically-controlled cooling system includes a machine controller 130 that receives parameters from one or more sensors 140, and a plurality of cooling units 120 in a distributed cooling system that are controlled by machine controller 130. Machine controller 130 may include one or more calculators (e.g., 310) and/or maps (e.g., 320-350) to determine input parameters, such as cooling demand, cooling capacities for each of a plurality of modes, and cooling efficiencies for each of the plurality of modes, based on one or more of the parameter(s) (e.g., ambient temperature and ambient pressure) received from sensor(s) 140. These input parameters may be provided to a process 400 to produce a cooling configuration that can be used to control the plurality of cooling units 120 (e.g., by control module 360). Process 400 may optimize the efficiency of the distributed cooling system, based on the input parameters, by maximizing operation of cooling units 120 in the most efficient mode.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in mobile equipment, it will be appreciated that it can be implemented in various other types of machines, including non-mobile equipment, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A dynamically-controlled cooling system comprising:
a plurality of cooling units configured to cool an electric power source, wherein each of the plurality of cooling units has a radiator circuit and a refrigeration circuit and operates in a first cooling mode and a second cooling mode; and
a machine controller that includes at least one processor configured to
receive one or more parameter values from one or more sensors,
determine a cooling capacity for each of the first cooling mode and the second cooling mode based on a first subset of the one or more parameter values,
determine a cooling efficiency for each of the first cooling mode and the second cooling mode based on a second subset of the one or more parameter values,
determine a cooling demand based on a third subset of the one or more parameter values, and
determine a cooling configuration based on the cooling demand, the cooling capacity, and the cooling efficiency, wherein the cooling configuration indicates one or both of a number of the plurality of cooling units to operate in the first cooling mode or a number of the plurality of cooling units to operate in the second cooling mode.

2. The dynamically-controlled cooling system of claim 1, wherein each of the first subset and the second subset comprise (i) ambient temperature or coolant to ambient temperature gradient and (ii) ambient pressure.

3. The dynamically-controlled cooling system of claim 2, wherein the machine controller comprises a memory that stores a cooling efficiency map for each of the first cooling mode and the second cooling mode, wherein determining the cooling efficiency for the first cooling mode comprises mapping (i) the ambient temperature or coolant to ambient temperature gradient and (ii) the ambient pressure to that cooling efficiency using the cooling efficiency map for the first cooling mode, and wherein determining the cooling efficiency for the second cooling mode comprises mapping the ambient temperature and the ambient pressure to that cooling efficiency using the cooling efficiency map for the second cooling mode.

4. The dynamically-controlled cooling system of claim 2, wherein the machine controller comprises a memory that stores a cooling capacity map for each of the first cooling mode and the second cooling mode, wherein determining the cooling capacity for the first cooling mode comprises mapping the ambient temperature and the ambient pressure to that cooling capacity using the cooling capacity map for the first cooling mode, and wherein determining the cooling capacity for the second cooling mode comprises mapping (i) the ambient temperature or coolant to ambient temperature gradient and (ii) the ambient pressure to that cooling capacity using the cooling capacity map for the second cooling mode.

5. The dynamically-controlled cooling system of claim 1, wherein the third subset comprises battery temperature and cooling temperature.

6. The dynamically-controlled cooling system of claim 1, wherein the machine controller is further configured to activate at least a subset of the plurality of cooling units to operate in the determined cooling configuration.

7. The dynamically-controlled cooling system of claim 1, wherein determining the cooling configuration comprises:
determining a most efficient cooling mode from among the first cooling mode and the second cooling mode based on the cooling efficiencies for the first cooling mode and the second cooling mode;
determining whether or not operation of the plurality of cooling units in the most efficient cooling mode will satisfy the demand based on the cooling capacity for the most efficient cooling mode; and
when determining that operation of the plurality of cooling units in the most efficient cooling mode will satisfy the demand, determining the cooling configuration to indicate that a minimum number of the plurality of cooling units required to satisfy the demand are to be operated in the most efficient cooling mode.

8. The dynamically-controlled cooling system of claim 7, wherein determining the cooling configuration further comprises:
  determining a least efficient cooling mode from among the first cooling mode and the second cooling mode based on the cooling efficiencies for the first cooling mode and the second cooling mode;
  when determining that operation of the plurality of cooling units in the most efficient cooling mode will not satisfy the demand,
    determining whether or not operation of the plurality of cooling units in the least efficient cooling mode will satisfy the demand based on the cooling capacity for the least efficient cooling mode, and
    when determining that operation of the plurality of cooling units in the least efficient cooling mode will satisfy the demand, determining the cooling configuration to maximize a percentage of the plurality of cooling units operating in the most efficient cooling mode and minimize a percentage of the plurality of cooling units operating in the least efficient cooling mode, while satisfying the demand based on the cooling capacities of the first cooling mode and the second cooling mode.

9. The dynamically-controlled cooling system of claim 8, wherein determining the cooling configuration further comprises, when determining that operation of the plurality of cooling units in the most efficient cooling mode will not satisfy the demand and when determining that operation of the plurality of cooling units in the least efficient cooling mode will not satisfy the demand, determining the cooling configuration to indicate that all of the plurality of cooling units are to be operated in a highest capacity cooling mode.

10. The dynamically-controlled cooling system of claim 1, wherein each of the plurality of cooling units comprises a refrigerant circuit condenser core and a radiator core through which coolant of the electric power source flows, wherein the first cooling mode utilizes the refrigerant circuit condenser core to chill the coolant, and wherein the second cooling mode does not utilize the refrigerant circuit condenser core to chill the coolant.

11. The dynamically-controlled cooling system of claim 1, wherein the electric power source comprises a battery.

12. A mobile equipment comprising:
  an electric power source;
  one or more sensors; and
  a dynamically-controlled cooling system comprising:
    a plurality of cooling units configured to cool the electric power source, wherein each of the plurality of cooling units has a radiator circuit and a refrigeration circuit and operates in a first cooling mode and a second cooling mode;
    a machine controller that includes at least one processor configured to
      receive one or more parameter values from the one or more sensors,
      determine a cooling capacity for each of the first cooling mode and the second cooling mode based on a first subset of the one or more parameter values,
      determine a cooling efficiency for each of the first cooling mode and the second cooling mode based on a second subset of the one or more parameter values,
      determine a cooling demand based on a third subset of the one or more parameter values, and
      determine a cooling configuration based on the cooling demand, the cooling capacity, and the cooling efficiency, wherein the cooling configuration indicates one or both of a number of the plurality of cooling units to operate in the first cooling mode or a number of the plurality of cooling units to operate in the second cooling mode.

13. The mobile equipment of claim 12, wherein each of the first subset and the second subset comprise (i) ambient temperature or coolant to ambient temperature gradient and (ii) ambient pressure.

14. A method to dynamically control a plurality of cooling units configured to cool an electric power source, wherein each of the plurality of cooling units has a radiator circuit and a refrigeration circuit and operates in a first cooling mode and a second cooling mode, the method comprising, by at least one processor of a machine controller:
  receiving one or more parameter values from one or more sensors;
  determining a cooling capacity for each of the first cooling mode and the second cooling mode based on a first subset of the one or more parameter values,
  determining a cooling efficiency for each of the first cooling mode and the second cooling mode based on a second subset of the one or more parameter values,
  determining a cooling demand based on a third subset of the one or more parameter values, and
  determining a cooling configuration based on the cooling demand, the cooling capacity, and the cooling efficiency, wherein the cooling configuration indicates one or both of a number of the plurality of cooling units to operate in the first cooling mode or a number of the plurality of cooling units to operate in the second cooling mode.

15. The method of claim 14, wherein each of the first subset and the second subset comprise (i) ambient temperature or coolant to ambient temperature gradient and (ii) ambient pressure.

16. The method of claim 15,
  wherein the machine controller comprises a memory that stores a cooling efficiency map for each of the first cooling mode and the second cooling mode, wherein determining the cooling efficiency for the first cooling mode comprises mapping (i) the ambient temperature or coolant to ambient temperature gradient and (ii) the ambient pressure to that cooling efficiency using the cooling efficiency map for the first cooling mode, and wherein determining the cooling efficiency for the second cooling mode comprises mapping the ambient temperature and the ambient pressure to that cooling efficiency using the cooling efficiency map for the second cooling mode, and
  wherein the memory that stores a cooling capacity map for each of the first cooling mode and the second cooling mode, wherein determining the cooling capacity for the first cooling mode comprises mapping (i) the ambient temperature or coolant to ambient temperature gradient and (ii) the ambient pressure to that cooling capacity using the cooling capacity map for the first cooling mode, and wherein determining the cooling capacity for the second cooling mode comprises mapping the ambient temperature and the ambient pressure to that cooling capacity using the cooling capacity map for the second cooling mode.

17. The method of claim 14, further comprising, by the at least one processor of the machine controller, activating at least a subset of the plurality of cooling units to operate in the determined cooling configuration.

18. The method of claim 14, wherein determining the cooling configuration comprises:
   determining a most efficient cooling mode from among the first cooling mode and the second cooling mode based on the cooling efficiencies for the first cooling mode and the second cooling mode;
   determining whether or not operation of the plurality of cooling units in the most efficient cooling mode will satisfy the demand based on the cooling capacity for the most efficient cooling mode; and
   when determining that operation of the plurality of cooling units in the most efficient cooling mode will satisfy the demand, determining the cooling configuration to indicate that a minimum number of the plurality of cooling units required to satisfy the demand are to be operated in the most efficient cooling mode.

19. The method of claim 18, wherein determining the cooling configuration further comprises:
   determining a least efficient cooling mode from among the first cooling mode and the second cooling mode based on the cooling efficiencies for the first cooling mode and the second cooling mode;
   when determining that operation of the plurality of cooling units in the most efficient cooling mode will not satisfy the demand,
   determining whether or not operation of the plurality of cooling units in the least efficient cooling mode will satisfy the demand based on the cooling capacity for the least efficient cooling mode, and
   when determining that operation of the plurality of cooling units in the least efficient cooling mode will satisfy the demand, determining the cooling configuration to maximize the number of the plurality of cooling units operating in the most efficient cooling mode and minimize the number of the plurality of cooling units operating in the least efficient cooling mode, while satisfying the demand based on the cooling capacities of the first cooling mode and the second cooling mode.

20. The method of claim 19, wherein determining the cooling configuration further comprises, when determining that operation of the plurality of cooling units in the most efficient cooling mode will not satisfy the demand and when determining that operation of the plurality of cooling units in the least efficient cooling mode will not satisfy the demand, determining the cooling configuration to indicate that all of the plurality of cooling units are to be operated in a highest capacity cooling mode.

* * * * *